US009819672B1

(12) United States Patent
Machani

(10) Patent No.: US 9,819,672 B1
(45) Date of Patent: *Nov. 14, 2017

(54) SHARING ACCESS TOKENS WITH TRUSTED USERS

(71) Applicant: EMC Corporation, Hopkinton, MA (US)

(72) Inventor: Salah E. Machani, Toronto (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/976,499

(22) Filed: Dec. 21, 2015

Related U.S. Application Data

(63) Continuation-in-part of application No. 14/752,530, filed on Jun. 26, 2015.

(51) Int. Cl.
*H04L 9/06* (2006.01)
*H04L 29/06* (2006.01)

(52) U.S. Cl.
CPC ............ *H04L 63/083* (2013.01); *H04L 63/04* (2013.01); *H04L 63/0435* (2013.01); *H04L 63/061* (2013.01); *H04L 63/0823* (2013.01); *H04L 63/0853* (2013.01); *H04L 63/101* (2013.01)

(58) Field of Classification Search
CPC ... H04L 9/3234; H04L 9/3213; H04L 9/3268; H04L 9/3263; H04L 63/0823; H04L 63/0853; H04L 63/0807; G06F 21/33
USPC .................... 726/4, 6, 7, 8–10; 713/156, 158
See application file for complete search history.

(56) References Cited

U.S. PATENT DOCUMENTS

| | | | | |
|---|---|---|---|---|
| 8,296,828 B2* | 10/2012 | Dalzell | ................... | G06F 21/41 713/168 |
| 8,549,300 B1* | 10/2013 | Kumar | ................... | H04L 9/3247 713/153 |
| 8,590,028 B2* | 11/2013 | Saxena | ................ | H04N 7/1675 380/247 |
| 8,782,774 B1* | 7/2014 | Pahl | ...................... | H04L 9/0825 709/237 |

(Continued)

OTHER PUBLICATIONS

Attribute-Based Access to Scalable Media in Cloud-Assisted Content Sharing Networks; Wu et al, IEEE Jun. 2013, 10.1109/TMM.2013.2238910.*

(Continued)

*Primary Examiner* — Jahangir Kabir
(74) *Attorney, Agent, or Firm* — Krishnendu Gupta; Jason A. Reyes

(57) ABSTRACT

Disclosed are techniques of sharing an access token. The techniques comprise generating a list that includes indications of users trusted to access a protected resource. The list indicates a first user and a second user. The technique also comprises inputting, by a first device associated with the first user, an authorization grant. The technique further comprises obtaining, by the first device using the authorization grant, an access token for the protected resource. The access token includes credentials for accessing the protected resource. The technique further comprises providing a copy of the access token to the second user by securely transmitting the copy of the access token to a second device associated with the second user. The copy of the access token enables the second device to access the protected resource.

9 Claims, 5 Drawing Sheets

(56) References Cited

U.S. PATENT DOCUMENTS

| | | | |
|---|---|---|---|
| 2006/0174121 A1* | 8/2006 | Omae | H04L 63/0823 |
| | | | 713/172 |
| 2008/0244721 A1* | 10/2008 | Barrus | G06F 21/6254 |
| | | | 726/9 |
| 2013/0318359 A1* | 11/2013 | Morris | G06F 21/62 |
| | | | 713/185 |
| 2014/0304790 A1* | 10/2014 | Bi | G06F 21/10 |
| | | | 726/7 |

OTHER PUBLICATIONS

Token enabled multiple access (TEMA) for packet transmission in high bit rate wireless local area networks; Taheri et al, IEEE 2002, 10.1109/ICC.2002.997181.*

* cited by examiner

TRUSTED
USER LIST
300

| USER | DEVICE IDENTIFIER | PUBLIC KEY/ CERTIFICATE |
|---|---|---|
| USER 1 | DEVICE 1-ID | DEVICE 1-PubKey-Cert |
| USER 2 | DEVICE 2-ID | DEVICE 2-PubKey-Cert |
| | | |
| | | |

302 · 304 · 306

ENTRIES 308

SHARING ACCESS TOKENS WITH TRUSTED USERS

RELATED APPLICATION

This application is a continuation-in-part application claiming priority to co-pending U.S. patent application Ser. No. 14/752,530, filed Jun. 26, 2015, entitled "SYNCHRONIZATION OF ACCESS TOKENS FOR SESSION CONTINUITY ACROSS MULTIPLE DEVICES", the entirety of which patent application is hereby incorporated by reference herein.

TECHNICAL FIELD

The present invention relates generally to authentication. More specifically, the present invention relates to sharing access tokens with trusted users.

BACKGROUND OF THE INVENTION

In the OAuth 2.0 Authorization Framework described in Request for Comments (RFC) 6749 ("OAuth 2.0"), a client requests access to resources that are controlled by a resource owner and hosted by a resource server, and is issued a different set of credentials to access the protected resources than those of the resource owner. Specifically, the client obtains an authorization grant from the resource owner, authenticates with an authorization server, and presents the authorization grant to the authorization server. The authorization server authenticates the client, validates the authorization grant, and issues an access token to the client. The client then requests the protected resource from the resource server and authenticates by presenting the access token. The resource server checks the access token, and grants the client access to the protected resource in response to receiving a valid access token from the client.

Previous approaches to granting access to protected resources based on access tokens have exhibited shortcomings. For example, it is not uncommon that multiple friendly trusted users (i.e., users that have a relationship or an association) desire access to the protected resource. However, in such a scenario, each user will be required to obtain an authorization grant from the resource owner, as well as subsequently performing the above described steps, before an access token will be issued by the authentication server. This is despite the fact that one of the users may already have a valid access token. This is undesirable.

There is, therefore, a need for further approaches regarding the granting and/or issuing of access tokens.

SUMMARY OF THE INVENTION

There is disclosed a computer-implemented method of sharing an access token, comprising executing, on at least one processor, the steps of: generating a list that includes indications of users trusted to access a protected resource, wherein the list indicates a first user and a second user; inputting, by a first device associated with the first user, an authorization grant; obtaining, by the first device using the authorization grant, an access token for the protected resource, wherein the access token includes credentials for accessing the protected resource; and providing a copy of the access token to the second user by securely transmitting the copy of the access token to a second device associated with the second user, wherein the copy of the access token enables the second device to access the protected resource.

There is also disclosed a computer program product having a non-transitory computer readable medium which stores a set of instructions operable to share an access token, the set of instructions, when carried out by computerized circuitry, causing the computerized circuitry to: generate a list that includes indications of users trusted to access a protected resource, wherein the list indicates a first user and a second user; input, by a first device associated with the first user, an authorization grant; obtain, by the first device using the authorization grant, an access token for the protected resource, wherein the access token includes credentials for accessing the protected resource; and provide a copy of the access token to the second user by securely transmitting the copy of the access token to a second device associated with the second user, wherein the copy of the access token enables the second device to access the protected resource.

There is further disclosed a device, comprising: memory; and processing circuitry coupled to the memory, the memory storing program code which, when executed by the processing circuitry, cause the processing circuitry to: generate a list that includes indications of users trusted to access a protected resource, wherein the list indicates a first user and a second user; input, by the device associated with the first user, an authorization grant; obtain, by the device using the authorization grant, an access token for the protected resource, wherein the access token includes credentials for accessing the protected resource; and provide a copy of the access token to the second user by securely transmitting the copy of the access token to a second device associated with the second user, wherein the copy of the access token enables the second device to access the protected resource.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 3 is a block diagram showing an example of a trusted user list used in one embodiment to share an access token and/or refresh token between first and second devices associated with respective first and second users;

DETAILED DESCRIPTION

Embodiments of the invention will now be described. It is understood that such embodiments are provided by way of example to illustrate various features and principles of the invention, and that the invention hereof is broader than the specific examples of embodiments disclosed herein.

Figure 1:
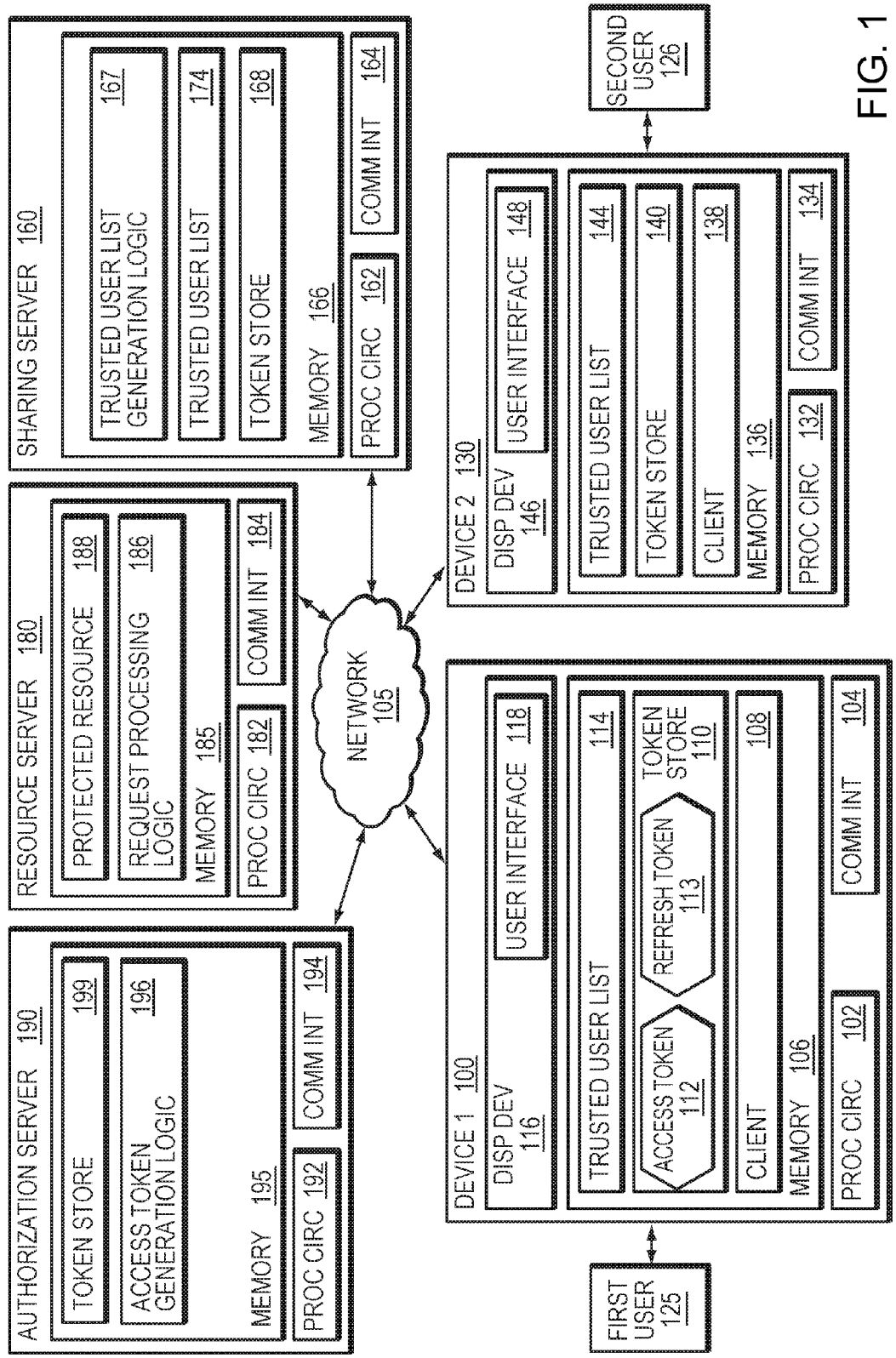
FIG. 1 is a block diagram showing components in an illustrative embodiment, the components operating such that an access token and a refresh token are acquired by a first device associated with a first user.

In the example of FIG. 1, a device 1 100, device 2 130, authorization server 190, sharing server 160 and resource server 180 are communicably interconnected through a network 105. The network 105 may, for example, include one or more communication networks of any specific type, such as the Internet, a WAN (Wide Area Network), a LAN (Local Area Network), or any other type of communication network.

Each of device 1 100, device 2 130, authorization server 190, sharing server 160 and resource server 180 include processing circuitry, communication interfaces, and memory. Specifically, device 1 100 includes processing circuitry 102, communication interfaces 104, and memory 106; device 2 130 includes processing circuitry 132, communication interfaces 134, and memory 136; authorization server 190 includes processing circuitry 192, communication interfaces 194, and memory 195; sharing server 160 includes processing circuitry 162, communication interfaces 164, and memory 166; and resource server 180 includes processing circuitry 182, communication interfaces 184, and memory 185.

The communication interfaces in each of device 1 100, device 2 130, authorization server 190, sharing server 160 and resource server 180 may, for example, include one or more adapters and/or network interface adapters for converting electronic and/or optical signals received over the network 105 into electronic form for use by the respective device or server.

The processing circuitry in each of device 1 100, device 2 130, authorization server 190, sharing server 160 and resource server 180 may, for example, include or consist of one or more microprocessors, e.g. central processing units (CPUs), multi-core processors, chips, and/or assemblies.

The memory in each of device 1 100, device 2 130, authorization server 190, sharing server 160 and resource server 180 may, for example, include or consist of any type of computer memory, such as volatile memory (e.g., RAM), or non-volatile memory (e.g. NVRAM), and/or semiconductor, magnetic or optical secondary computer storage (e.g. solid state, magnetic, or optical drives), and/or another computer readable medium, for storing program code executable on the respective processing circuitry, and for storing data operated on by such program code. For example, program code executable on device 1 100 is shown including client 108, program code executable on device 2 130 is shown including client 138, program code executable on authorization server 190 is shown including access token generation logic 196, program code executable on sharing server 160 is shown including trusted user list generation logic 167 and program code executable on resource server 180 is shown including request processing logic 186. Protected resource 188 in the resource server 180 may include or consist of protected data and/or a protected application or service that may also include program code executable at least in part on resource server 180.

Each of authorization server 190, sharing server 160, device 1 100, and device 2 130 may also include a token store that may be used to store one or more access tokens. For example, authorization server 190 may include token store 199, sharing server 160 may include token store 168, device 1 100 may include token store 110, and device 2 130 may include token store 140.

Each of sharing server 160, device 1 100, and device 2 130 may further include a trusted user list used to store data describing one or more users that are trusted to access the protected resource 188. For example, sharing server 160 may include trusted user list 174, device 1 100 may include trusted user list 114, and device 2 130 may include trusted user list 144. In one embodiment, the trusted user list 174 is pushed out to the devices (e.g., 100, 130) associated with users indicated by trusted user list 174, whenever there is a change to the list, such as a user being added to the list or a user being removed from the list.

Each of device 1 100 and device 2 130 may further include a display device (e.g. liquid crystal display, etc.) operable to display a graphical user interface through which respective first and second users 125 and 126 may enter (e.g. type or select using an input device such as a keyboard, and/or a computer mouse or other pointing device) a username, password, and/or passphrase or other data through one or more forms or other user interface constructs. For example, device 1 100 includes display device 116 operable to display user interface 118 and device 2 130 includes display device 146 operable to display user interface 148.

For each of device 1 100, device 2 130, authorization server 190, sharing server 160 and resource server 180, the processing units and the memory together form control circuitry, which is constructed and arranged to carry out various methods and functions as described herein. Each memory includes a variety of software constructs realized in the form of executable instructions. When the executable instructions are executed by the processing units, the processing units are caused to carry out the operations of the software constructs. Although certain software constructs are specifically shown and described, it is understood that the memory may include other software constructs, which are not shown, such as an operating system and various applications, and/or other processes or daemons.

It will be evident that device 1 100 and/or device 2 130 may be embodied using any specific type of computerized user device, including but not limited to desktop computers, and/or mobile devices such as laptop computers, tablet computers, smartphones, personal digital assistants (PDAs), and/or other types of user devices. It will also be evident that authorization server 190, sharing server 160 and/or resource server 180 may be embodied using any specific type of server computer systems.

During operation of the embodiment shown in FIG. 1, the device 1 100 obtains an authentication grant from the resource owner 125 (N.B., in this particular embodiment the first user is the resource owner). It should be understood that the authorization grant may be a credential that represents the resource owner 125 authorization to access the protected resource 188. For example, the authorization grant may be password credentials, such as a username and password, obtained from the resource owner 125 through the user interface 118.

Device 1 100 uses the authorization grant to obtain access token from authorization server 190. For example, client 108 authenticates to authorization server 190, and presents the authorization grant to access token generation logic 196. In turn, the access token generation logic 196 responds by validating the authorization grant and issuing to the client 108 the access token 112.

In this particular embodiment, the access token 112 represents an authorization that contains credentials, which are different from the authorization grant obtained from the resource owner 125, and which allow access to the protected resources 188. For example, the access token 112 may be a string denoting a specific scope of access permitted with regard to protected resource 188, a time duration (or "lifetime") for which the access token is valid, and/or other access attributes.

Upon validating the authorization grant, the access token generation logic 196 also issues the refresh token 113 to the client 108. The refresh token 113 contains credentials that may be used to obtain a new access token from authorization server 190 when the access token 112 becomes invalid or expires. Unlike access token 112, the refresh token 113 is used only with the authorization server 190, and is not sent to the resource server 180.

The client 108, using the access token 112 and the refresh token 113 that are stored in the token store 110, is then able to authenticate to resource server 180 by presenting access token 112 to request processing logic 186. The request processing logic 186 validates access token 112, and in response to finding that access token 112 is valid, grants client 108 access to protected resource 188.

Next, the first user 125 offers the second user 126 (e.g., the second user may be an associate of the first user) access to the protected resource 188 by sending an offer from the device 1 100 to the device 2 130. As will be appreciated, the second user 126 can accept or refuse this offer by responding accordingly. For example, if the second user 126 refuses the offer then a suitable response is sent to the first user 125. However, if the second user 126 wishes to accept, the second user 126, via device 2 130, responds positively to the communication by accepting the offer and sending a public key to the first device 1 100. It should be understood that in this particular embodiment the public key is part of a public-private key pair associated with the device 2 130. The public key enables the device 1 100 to encrypt data that is destined for the device 2 130. The private key, which is maintained at the device 2 130, can decrypt the said encrypted data.

After the above positive communication with the device 2 130, device 1 100 communicates with the sharing server 160 requesting a list of trusted users to be generated. It should be appreciated that in this embodiment the trusted users are those trusted to access the protected resource 188. As a result of the request, the trusted user list generation logic 167 generates the trusted user list 174 to include the first user 125 and the second user 126 as trusted users. Device 1 100 then provides an encrypted copy of the access token 112 and/or refresh token 113 to the sharing server 160. By virtue of the list 174, the sharing server 160 is aware that the encrypted access token 112 and/or refresh token 113 can be shared with the device 2 130.

Sharing server 126 shares the access token 112 and/or refresh token 113 with the second user 126 indicated in the trusted user list 174 by securely transmitting a copy of the access token 112 and/or refresh token 113 to the device 2 130. For example, the sharing server 126 may notify the device 2 130 that the access token 112 and/or refresh token 113 are available, and the device 2 130 may in turn respond asking for the access token 112 and/or refresh token 113 to be transmitted. After the copy of the access token 112 is transmitted to the device 2 130, client 138 on device 2 130 may access the protected resource 188, using a copy of the access token 112, without the second user 126 having to request the authorization grant from resource owner 125. In an embodiment in which only the copy of the refresh token 113 is transmitted to the device 2 130, client 138 may use the copy of the refresh token 113 to obtain a new access token, that is then used to access protected resource 188, also without the second user 126 having to request the authorization grant from resource owner 125.

In one embodiment, sharing server 160 may detect, in response to receipt of a request for access token 112 from device 2 160, that access token 112 has expired. In that case, the server 1600 may return an error code to the device from which the request was received, indicating that the requested access token has expired.

In a further embodiment, the access token 112 and/or refresh token 113 may be securely transmitted, using a client-server approach, from device 1 100, through the sharing server 160, to device 2 130. For example, the secure transmission of the access token 112 and/or refresh token 113 comprises the client 1 108 first encrypting access token 112 and/or refresh token 113 using a randomly generated data encryption key ("DEK"). In addition, the client 1 108 generates an encrypted version of DEK by encrypting DEK with the public key of the public-private key pair associated with the device 2 130. Encrypted version of the access token 112 and/or refresh token 113 together with the encrypted versions of DEK may be transmitted as an enveloped data package by device 1 100. The enveloped data package transmitted to the sharing server 160 contains the encrypted version of access token 112 and/or refresh token 113 together with the encrypted version of DEK generated using the public key. After it receives the enveloped data package from device 1 100, sharing server 160 transmits a notification to the device 2 130 indicating that the device can retrieve access token 112 and/or refresh token 113 from sharing server 160. The sharing server 160 then receives a request for the access token 112 and/or refresh token 113 from device 2 130, and returns the enveloped data package. For example, sharing server 160 responds to a request for access token 112 and/or refresh token 113 received from device 2 130 by transmitting to device 2 130 the enveloped data package containing i) the encrypted version of DEK generated using the public key associated with device 2 130, and ii) the encrypted version of access token 112 and/or refresh token 113 created using DEK.

Alternatively, the access token 112 and/or refresh token 113 may be securely transmitted using direct communications between device 1 100 and device 2 130 in a peer-to-peer type of distribution. For example, in one embodiment, the secure transmission of the access token 112 and/or refresh token 113 comprises the client 1 108 first encrypting access token 112 and/or refresh token 113 using a randomly generated data encryption key ("DEK"). In addition, the client 1 108 generates an encrypted version of DEK by encrypting DEK with the public key of the public-private key pair associated with the device 2 130. The encrypted version of access token 112 and/or refresh token 113 may then be shared by transmitting an enveloped data package directly to the device 2 130 containing a copy of the encrypted version of access token 112 and/or refresh token 113 together with the encrypted version of DEK generated using the public key.

It should be further understood that the access token and/or refresh token may have control attributes associated therewith. For example, the control attributes may indicate whether or not the second user is allowed to share the access token with a third user. Either the client on the second user's device and/or the sharing server and/or the authorization server could enforce this policy. Further, the control attributes may indicate if the first user (resource owner) wants to be notified when the access token is used by second user.

It should also be understood from the foregoing that the trusted user list can be generated in many ways. For example, as discussed above in the client-server approach, the sharing server 160 may receive a request from the device 1 100 to generate the list 174. The sharing server 160 can subsequently consult the list in order to determine the trusted users with whom the access token 112 and/or the refresh token 113 can be shared. The sharing server 160 may also be configured to push the list 174 to the device 1 100 and the device 2 130 such that the users 125 and 126 can access their respective lists 114 and 144 to facilitate communicating and/or sharing in a group like manner. However, in the peer-to-peer type of distribution, it should also be appreciated that the device 1 100 alone may generate the list 114. In this approach, the device 1 may be the only entity with access to the list.

It should be further understood, as discussed above, that the creation of the trusted user list may first be initiated by the first user 125. In this particular embodiment, the first user 125 is the resource owner, and the list may be formed by first adding an entry for the first user. There may, however, be further users added to the list over time. For example, the first user 125 may selectively add the second user 126 by sending a request, either directly or indirectly, from device 1 100 to device 2 130, requesting that the second user 126 accept the offer from the first user 125 to be added to the list. Upon accepting the offer, the second user 126 may be added to the list, and the access token 112 and/or refresh token 113 may be shared with device 2 130 of the second user 126 as described above.

Alternatively, the second user 126 may request an access token 112 to access the protected resource 188. If the request is directly to the first user 125 then the first user 125 may determine whether or not to share the access token 112 and/or refresh token 113. However, the request may also be directed to one or both of the authentication server 190 and/or sharing server 160. It may then be determined that the second user 126 is not on the trusted user list so a confirmation request message may be transmitted to the first user 125 through the device 1 100 requesting confirmation from the first user 125 that the second user 126 should be added to the trusted list. In response to receipt of the confirmation request message, the device 1 100 may generate a prompt or other type of user interface object that allows the first user 125 to accept or deny the request. For example, client 108 in device 1 100 may generate a form or other display object in user interface 118 that allows the first user 125 to enter a master passphrase, or the like, into device 1 100. When the device 1 100 receives passphrase data through their respective user interface, the passphrase data received is then compared to master passphrase data for the user. The new user, in this example the second user 126, is only added to the trusted user list if the passphrase data received from the second user matches that already stored. Once added to the list, the access token 112 and/or refresh token 113 may be shared with device 2 130 associated with the second user 126.

Figure 2:
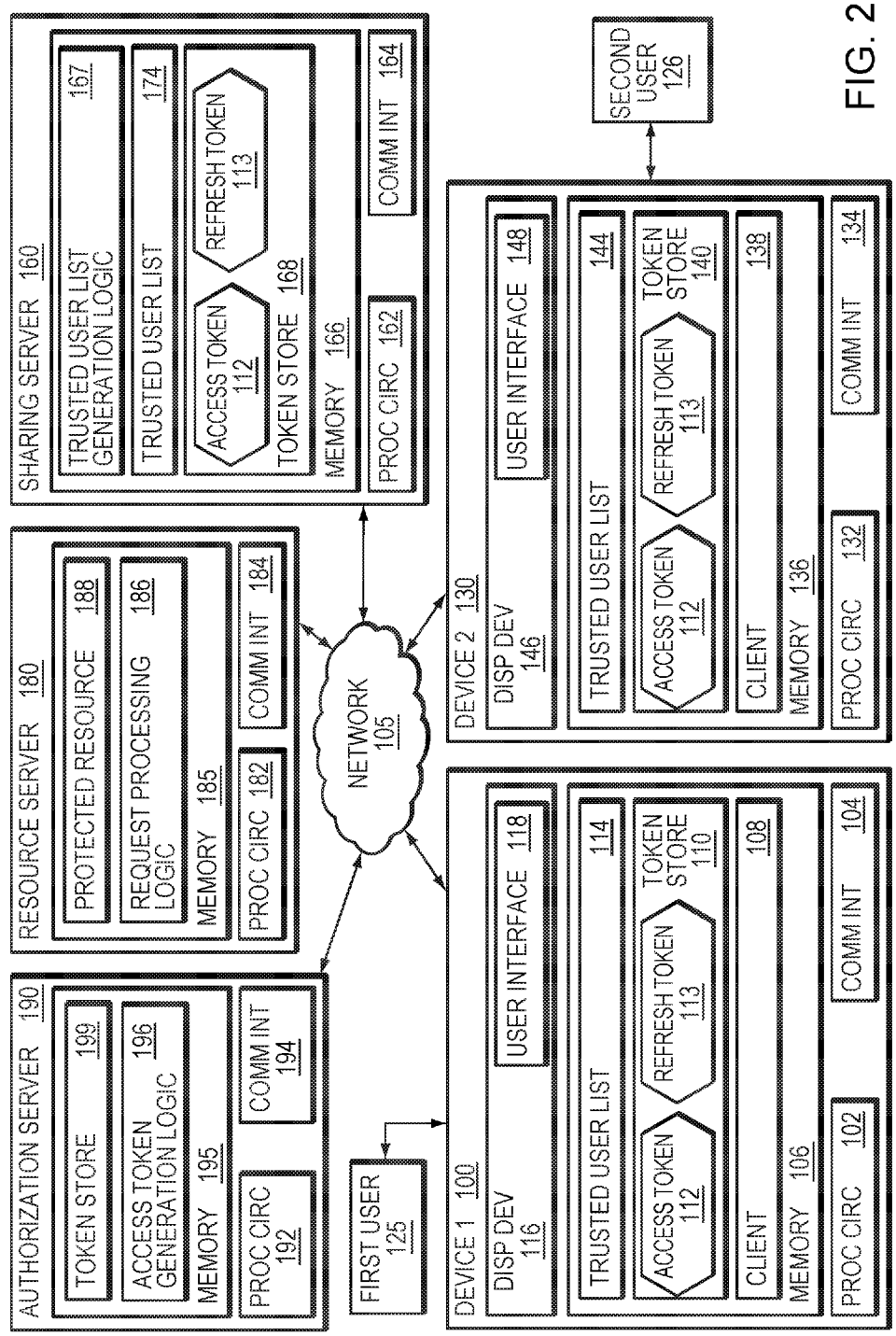
FIG. 2 is a block diagram showing the components in the illustrative embodiment of FIG. 1 following sharing of the access token and the refresh token between first and second devices associated with respective first and second users.

FIG. 2 is a block diagram showing the components in the illustrative embodiment of FIG. 1, following sharing of access token 112 and refresh token 113 between device 1 100 and device 2 130. As shown in FIG. 2, following sharing of access token 112 and refresh token 113 between device 1 100 and device 2 130, copies of access token 112 and refresh token 113 are stored in token store 168 of the sharing server 160 and the token store 140 of device 2 130. The copy of access token 112 in token store 140 allows the second user 126 to access protected resource 188 through device 2 130, without having to provide an authorization grant (e.g. username and password) to client logic 138, and going through the steps, as described above, of obtaining a new access token. Instead, client 138 presents the copy of access token 112 from token store 140 to request processing logic 186 in order to immediately obtain access to protected resource 188 for the second user 126 on device 2 130.

While FIG. 2 shows both access token 112 and refresh token 113 having been shared with the device 2 130, in an alternative embodiment only refresh token 113 is shared. In such an alternative embodiment, the refresh token 113 would be stored in token store 140. For example, when second user 126 initiates an access to protected resource 188 from device 2 130, client 138 locates a copy of refresh token 113 stored in token store 140, uses refresh token 113 to obtain a new access token from authorization server 190, and then presents the new access token obtained from authorization server 190 to request processing logic 186 such that the second user 126 can access the protected resource 188 via the device 2 130 without having to obtain an authorization grant (e.g. username and password) from resource owner 125.

FIG. 3 is a block diagram showing an example of a trusted user list 300 used in one embodiment to share access tokens between trusted users of a protected resource 188. The trusted user list 300 includes a number of entries 308, each of which represents one of the trusted users in the list. A first column 302 stores the identity of each trusted user. A second column 304 stores the device identifier for the corresponding trusted device of the trusted user, such as a device name or address that may be used to identify and/or communicate with the device. A third column 306 stores a public key or public key certificate for each of the devices associated with the trusted users. The public key in column 306 is part of a key pair, that also includes a private key securely maintained by the corresponding trusted device, and that enables secure communication between devices based on public key cryptography.

Figure 4:
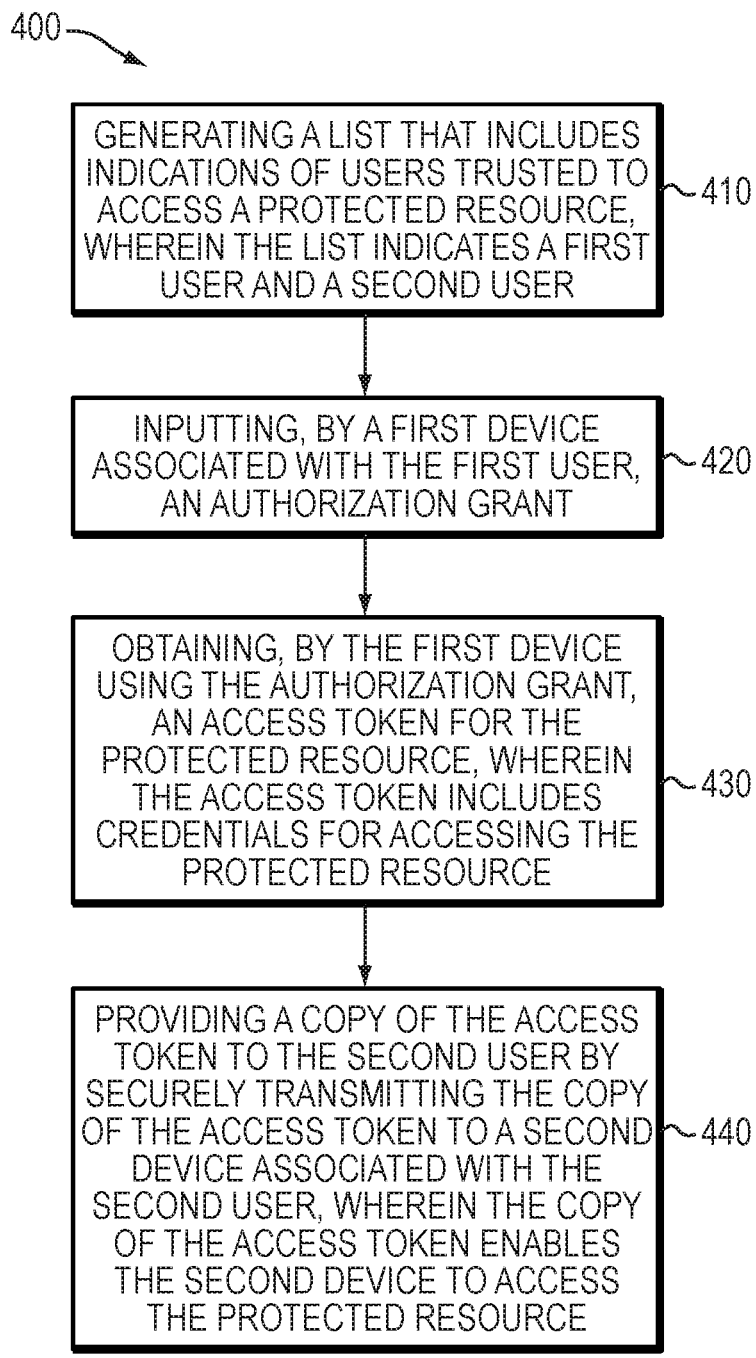
FIG. 4 is a flow chart showing an example of method steps performed in an illustrative embodiment for sharing an access token and/or refresh token with trusted users.

FIG. 4 is a flow chart showing an example of method steps 400 performed in an illustrative embodiment to share an access token between trusted users. At step 410, the method comprises the step of generating a list that includes indications of users trusted to access a protected resource. The list indicates a first user and a second user that is an associate of the first user. At step 420, the method comprises the step of inputting, by a first device associated with the first user, an authorization grant. At step 430, the method comprises the step of obtaining, by the first device using the authorization grant, an access token for the protected resource. The access token includes credentials for accessing the protected resource. At step 440, the method comprises the step of providing a copy of the access token to the second user by securely transmitting the copy of the access token to a second device associated with the second user. The copy of the access token enables the second device to access the protected resource.

In an example use case, that incorporates the method steps 400, and with reference to FIGS. 1 to 3, the device 1 100 facilitates generation of the trusted user list that includes indications of users trusted to access the protected resource 188. It should be understood that in at least one embodiment the device 1 100 requests the sharing server to create the list 174 of trusted users. For example, the trusted user list 174 includes the resource owner first user 125 and the second user 126 associated with the first user 125.

The client 108 of the device 1 100 subsequently receives an authentication grant from the first user that enables the access token 112 and/or the refresh token 113 to be obtained from the authorization server 190. For example, in this particular embodiment, the device 1 100 authenticates to the authorization server 190 and presents the authorization grant to the access token generation logic 196. The authentication server 190 in turn provides the access token 112 and/or refresh token to the device 1 100 after authenticating and validating the authentication grant.

Furthermore, the device 1 100 shares the said access token 112 and/or refresh token with the device 2 130 by securely providing the access token and/or refresh token in an encrypted form to the sharing server 160. For example, this may involve the client 108 randomly generating a symmetric data encryption key ("DEK") and encrypting the access token and/or the refresh token using the DEK. It should be understood that the client 108 may encrypt the access token and/or the refresh token with the DEK using a key wrap algorithm or the like (e.g., a key wrap algorithm as described in the AES key wrap specification). The client 108 also creates an encrypted version of the DEK for the second user 126 by using the public key 306 associated with the second user in order to encrypt the DEK. The client 108 creates an enveloped data package for the second user 126 that contains a copy of the encrypted access token and/or refresh token, and the encrypted version of the DEK created by encrypting the DEK using the appropriate public key. The package is finally provided to the sharing server 160 for sharing with the second user 126.

Following receipt of the enveloped data package, the sharing server 190 notifies the second user 126 that the access token and/or refresh token obtained by the client 108 on the device 1 100 are available for sharing. The notification provided by the sharing server 160 may, for example, be provided by transmitting a message from the server 160 to the device 2 130 over the network 105. In response to the notification, the client 138 connects to the sharing server 126 (e.g. over Network 105) and requests a copy of the access token and/or refresh token. In response to the request, the sharing server 160 returns (e.g. over Network 105) the enveloped data package to the device 2 130. As a result, device 2 130 receives the enveloped data package transmitted from the server 190, and stores it in a local store (e.g. token store 140). The device 2 130 may then access the encrypted version of the DEK in the enveloped data package using the corresponding private key, and in turn use the decrypted DEK to decrypt the access token and/or refresh token also contained in the enveloped data package. Device 2 130 can finally access the protected resource 188 with the access token 112.

Figure 5:
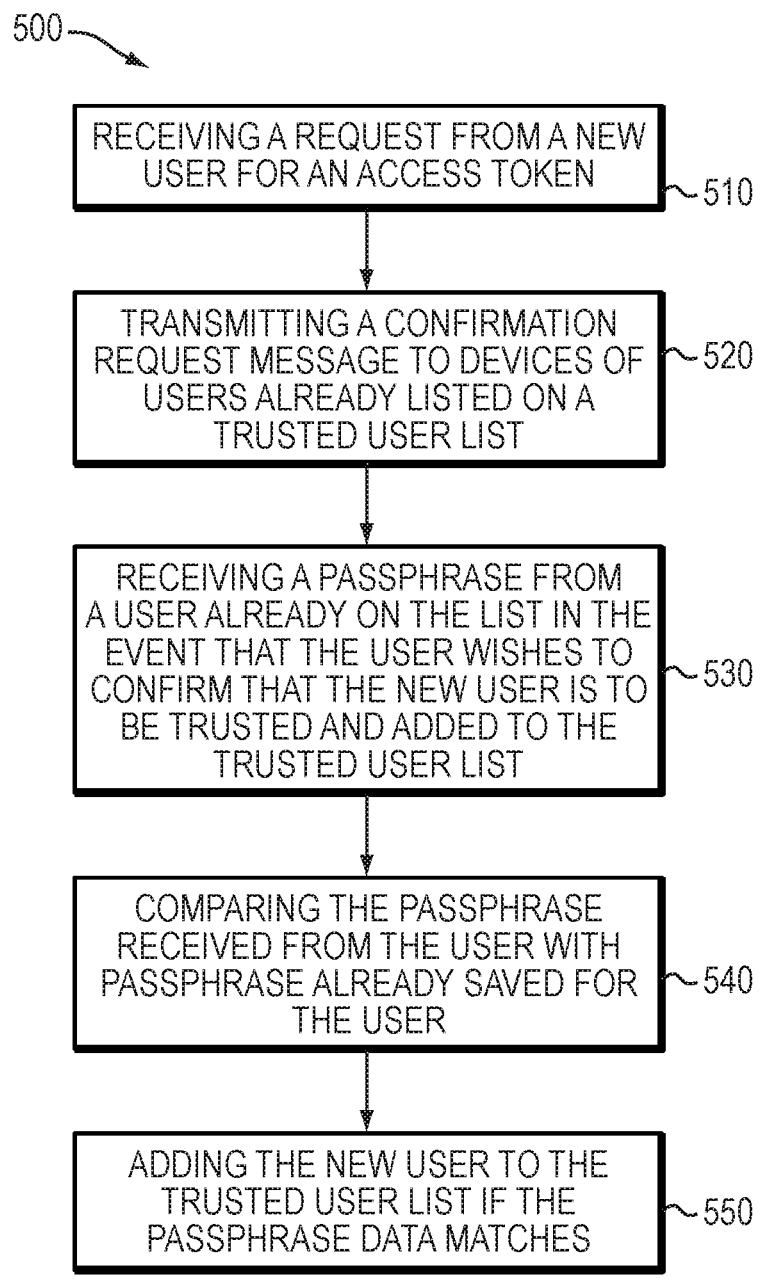
FIG. 5 is a flow chart showing method steps performed in an illustrative embodiment to establish a user as a trusted user for purposes of sharing access token.

FIG. 5 is a flow chart showing method steps 500 performed in an illustrative embodiment to establish a user as a trusted user for purposes of access token sharing. At step 510, a request for an access token is received from a user that has not yet been added to the trusted user list (a "new" user). For example, the user request may comprise details of the device from which the user request was sent as well as information identifying the particular user. Upon receipt of the request, it is determined that the new device is not indicated in a list of trusted devices for the resource owner. As a result of determining that the new user is not listed in the list of trusted users, at step 520 a confirmation request message is transmitted to devices of users already listed on the trusted user list, requesting confirmation that the new user should be considered a trusted user. For example, the only device on the list may be that associated with the resource owner. The confirmation request causes one or more of the devices associated with users on the list to generate a prompt in their user interface requesting them to enter passphrases, or the like, or simply requiring entry of a positive response, in order to confirm that the new user is to be added to the trusted user list. The prompt generated requesting the passphrase may also include an indication of the new user (e.g., name). If the users wish to confirm that the new user is to be trusted and accordingly added to the trusted user list, at step 530 the users enter passphrase data. At step 540, the passphrase data received from the users is compared with passphrase data already saved for each user (e.g., user may have earlier stored passphrase data). The comparison may be performed either at the existing device or at a server. At step 550, the new user is only added to the trusted user list if the passphrase data matches. If the new user is added to the trusted user list, the access token and/or refresh token encrypted with the DEK, and the DEK encrypted with the public key of new device associated with the new user, are transmitted to the new device, either through the sharing server using a client-server model, or directly from the existing device using a peer-to-peer model. The newly added second user 126 may then be able to decrypt the access token and/or refresh token with the assistance of the private key on the second device resulting in the second user being able to access the protected resources.

While the above description describes an authorization server and a sharing server, it should be understood that in some embodiments the authorization server and sharing server may be combined into one entity that possesses similar features as described above.

While the above description makes reference to access tokens, entities and protocols described in OAuth 2.0, the disclosed system is not so limited. The disclosed system may alternatively be embodied in or using other authorization frameworks such as Security Assertion Markup Language (SAML), and authentication protocols such as Kerberos when authentication and authorization are delegated to a local agent on device.

Those skilled in the art will recognize that the disclosed techniques are significantly more than the abstract idea of accessing a resource, and that embodiments based on the disclosed techniques address technical problems arising from the approaches used in previous technologies. Embodiments of the disclosed techniques may, for example, advantageously allow an access token to be shared with multiple users, enabling access to a protected resource in near real-time from multiple users without having to request a new authorization grant from the resource owner.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A computer-implemented method, comprising executing, on at least one processor, the steps of:
    generating a list that includes indications of users trusted to access a protected resource, wherein the list indicates a first user and a second user different to the first user;
    inputting, by a first device associated with the first user, an authorization grant;
    obtaining, by the first device using the authorization grant, an access token and/or a refresh token, wherein the access token includes credentials for accessing the protected resource, and wherein the refresh token is-configured to obtain a new access token for accessing the protected resource;
    providing a copy of the access token and/or the refresh token to the second user indicated in the list by securely transmitting the copy of the access token and/or the refresh token to a second device associated with the second user, the transmitting including:
        i) generating an encrypted version of the access token and/or the refresh token by encrypting the access token and/or the refresh token using a random data encryption key,
        ii) generating an encrypted version of the random data encryption key for the second user by encrypting the random data encryption key with a public key associated with the second user,
        iii) creating an enveloped data package for the second user, the package containing the copy of the encrypted version of the access token and/or the refresh token and the encrypted version of the random data encryption key,
        iv) transmitting the enveloped data package to remote server,
        v) transmitting a notification to the second device, the notification indicating to the second user that the enveloped data package is available from the remote server,
        vi) receiving, at the remote server, a request for the enveloped data package from the second user using the second device, and
        vii) transmitting the enveloped data package from the remote server to the second device in response to the request; and
    accessing, by the second user using the second device, the protected resource by using a decrypted version of the access token or a new access token obtained using the refresh token.

2. The method as claimed in claim 1, further comprising:
    detecting, in response to receipt of the request, that the access token has expired; and
    in response to detecting that the access token has expired, returning an error code to the second device.

3. The method as claimed in claim 1, further comprising:
    adding a new user to the trusted user list by:
        receiving a request from a new device associated with the new user;
        in response to receiving the request from the new device, transmitting a confirmation request to at least one of the first and second devices, the confirmation request requiring at least one of the first and second users to perform an act at the corresponding one of the first and second devices; and
        based on the performed act, adding the new user to the trusted user list.

4. A computer program product having a non-transitory computer readable medium which stores a set of instructions, the set of instructions, when carried out by computerized circuitry, causing the computerized circuitry to:
    generate a list that includes indications of users trusted to access a protected resource, wherein the list indicates a first user and a second user different to the first user;
    input, by a first device associated with the first user, an authorization grant;
    obtaining, by the first device using the authorization grant, an access token and/or a refresh token, wherein the access token includes credentials for accessing the protected resource, and wherein the refresh token is-configured to obtain a new access token for accessing the protected resource;
    provide a copy of the access token and/or the refresh token to the second user indicated in the list by securely transmitting the copy of the access token and/or the refresh token to a second device associated with the second user, the transmitting including:
i) generating an encrypted version of the access token and/or the refresh token by encrypting the access token and/or the refresh token using a random data encryption key,
ii) generating an encrypted version of the random data encryption key for the second user by encrypting the random data encryption key with a public key associated with the second user,
iii) creating an enveloped data package for the second user, the package containing the copy of the encrypted version of the access token and/or the refresh token and the encrypted version of the random data encryption key,
iv) transmitting the enveloped data package to remote server,
v) transmitting a notification to the second device, the notification indicating to the second user that the enveloped data package is available from the remote server,
vi) receiving, at the remote server, a request for the enveloped data package from the second user using the second device, and
vii) transmitting the enveloped data package from the remote server to the second device in response to the request; and
access, by the second user using the second device, the protected resource by using a decrypted version of the access token or a new access token obtained using the refresh token.

5. The computer program product as claimed in claim 4, wherein the set of instructions, when carried out by computerized circuitry, further causes the circuitry to:
detect, in response to receipt of the request, that the access token has expired; and
in response to detecting that the access token has expired, return an error code to the second device.

6. The computer program product as claimed in claim 4, wherein the set of instructions, when carried out by computerized circuitry, further causes the circuitry to add a new user to the trusted user list by:
receiving a request from a new device associated with the new user;
in response to receiving the request from the new device, transmitting a confirmation request to at least one of the first and second devices, the confirmation request requiring at least one of the first and second users to perform an act at the corresponding one of the first and second devices; and
based on the performed act, adding the new user to the trusted user list.

7. A device, comprising:
memory; and
processing circuitry coupled to the memory, the memory storing program code which, when executed by the processing circuitry, cause the processing circuitry to:
generate a list that includes indications of users trusted to access a protected resource, wherein the list indicates a first user and a second user different to the first user;
input, by a first device associated with the first user, an authorization grant;
obtain, by the first device using the authorization grant, an access token and/or a refresh token, wherein the access token includes credentials for accessing the protected resource, and wherein the refresh token is-configured to obtain a new access token for accessing the protected resource;
provide a copy of the access token and/or the refresh token to the second user indicated in the list by securely transmitting the copy of the access token and/or the refresh token to a second device associated with the second user, the transmitting steps including:
i) generating an encrypted version of the access token and/or the refresh token by encrypting the access token and/or the refresh token using a random data encryption key,
ii) generating an encrypted version of the random data encryption key for the second user by encrypting the random data encryption key with a public key associated with the second user,
iii) creating an enveloped data package for the second user, the package containing the copy of the encrypted version of the access token and/or the refresh token and the encrypted version of the random data encryption key,
iv) transmitting the enveloped data package to remote server,
v) transmitting a notification to the second device, the notification indicating to the second user that the enveloped data package is available from the remote server,
vi) receiving, at the remote server, a request for the enveloped data package from the second user using the second device, and
vii) transmitting the enveloped data package from the remote server to the second device in response to the request; and
access, by the second user using the second device, the protected resource by using a decrypted version of the access token or a new access token obtained using the refresh token.

8. The device as claimed in claim 7, wherein the program code, when executed by the processing circuitry, further causes the processing circuitry to:
detect, in response to receipt of the request, that the access token has expired; and
in response to detecting that the access token has expired, return an error code to the second device.

9. The device as claimed in claim 7, wherein the program code, when executed by the processing circuitry, further causes the processing circuitry to add a new user to the trusted user list by:
receiving a request from a new device associated with the new user;
in response to receiving the request from the new device, transmitting a confirmation request to at least one of the first and second devices, the confirmation request requiring at least one of the first and second users to perform an act at the corresponding one of the first and second devices; and
based on the performed act, adding the new user to the trusted user list.

* * * * *